(12) United States Patent
Cahen

(10) Patent No.: US 11,345,062 B2
(45) Date of Patent: *May 31, 2022

(54) SINGLE-PIECE MOLDED FRAME FOR A COMPOSITE LAY-UP SKIN

(71) Applicant: FERRY CAPITAIN, Vecqueville (FR)

(72) Inventor: Mathieu Cahen, Vaucouleurs (FR)

(73) Assignee: FERRY CAPITAIN, Vecqueville (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/479,351

(22) PCT Filed: Mar. 6, 2018

(86) PCT No.: PCT/FR2018/050511
§ 371 (c)(1),
(2) Date: Jul. 19, 2019

(87) PCT Pub. No.: WO2018/162838
PCT Pub. Date: Sep. 13, 2018

(65) Prior Publication Data
US 2019/0351585 A1 Nov. 21, 2019

(30) Foreign Application Priority Data
Mar. 10, 2017 (FR) ...................... 1751951

(51) Int. Cl.
*B29C 33/30* (2006.01)
*B29C 33/00* (2006.01)
*B29C 33/38* (2006.01)

(52) U.S. Cl.
CPC ........ *B29C 33/307* (2013.01); *B29C 33/0011* (2013.01); *B29C 33/38* (2013.01)

(58) Field of Classification Search
CPC .... B29C 33/307; B29C 33/0011; B29C 33/38
See application file for complete search history.

(56) References Cited

U.S. PATENT DOCUMENTS

| 10,683,567 B2 | 9/2020 | Prunier |
| 2010/0140448 A1 | 6/2010 | Koerwien |
| 2017/0260608 A1 | 9/2017 | Prunier |

FOREIGN PATENT DOCUMENTS

| AT | 503547 A4 | 11/2007 |
| CN | 201273045 Y | 7/2009 |
| CN | 101780697 A | 7/2010 |
| CN | 102145752 A | 8/2011 |

(Continued)

OTHER PUBLICATIONS

Ferry Capitain (Cast Tooling for Aerospace Processes Invar & Refractory Steel Materials, available at https://www.ferry-capitain.eu/wp-content/uploads/2020/06/4FCAerospace-feb-2016-email.pdf, Feb. 15, 2016, pp. 1-8) (Year: 2016).*

(Continued)

*Primary Examiner* — Yung-Sheng M Tsui
(74) *Attorney, Agent, or Firm* — Seckel IP, PLLC

(57) ABSTRACT

The invention relates to a frame (2) including at least one part that is intended to support a skin (3) for receiving a part made from a composite material to be polymerized in an autoclave, said skin (3) defining the general shape of said part. The frame (2) is characterized in that it is a single-piece foundry piece.

21 Claims, 1 Drawing Sheet

(56) References Cited

FOREIGN PATENT DOCUMENTS

| CN | 202293361 U | 7/2012 |
|---|---|---|
| CN | 103527915 A | 1/2014 |
| CN | 203864033 A | 10/2014 |
| CN | 203904394 A | 10/2014 |
| CN | 106612768 A | 5/2017 |
| FR | 3025807 A1 | 3/2016 |

OTHER PUBLICATIONS

Starke & Staley, Application of modern aluminum alloys to aircraft, Progress in Aerospace Sciences, vol. 32, Issues 2-3, 1996, pp. 131-172 (Year: 1996).*
French Search Report and Written Opinion dated Aug. 17, 2017 in priority application No. FR1751951; w/ English pmachine translation (15 pages).
International Search Report and Written Opinion dated Apr. 26, 2018 issued in corresponding application No. PCT/FR2018/050511; w/ English partial translation and partial machine translation (19 pages).
Chinese Office Action and Search Report dated Jan. 14, 2021 in counterpart application No. CN201880010241.0; w/English translation of Office Action (total 18 pages).
Chun et al., "Composite airframe structures—Practical design information and date", Conmilit Press Ltd, 1992, Hongkong, pp. 112-115 (1995); w/English (partial-incomplete) machine translation (total 12 pages).

* cited by examiner

SINGLE-PIECE MOLDED FRAME FOR A COMPOSITE LAY-UP SKIN

BACKGROUND OF THE INVENTION

(1) Field of the Invention

The present invention falls within the field of the support jigs for receiving a part made from a composite material for its polymerization in an autoclave.

More particularly, the present invention relates to a frame, at least one part of which is intended to support a skin for receiving a part made from a composite material to be polymerized in an autoclave, said skin defining the general shape of said part, specifically said frame is a single-piece foundry part.

Such a device will find a particular application in the field of the production of parts made of composite material resulting from an operation of laying-up skins made of a pre-impregnated fabric.

In general, such a part made from a composite material is mounted by successive lay-ups of a pre-impregnated type fabric on a metal skin resting on a frame. The composite assembly, skin and frame, is inserted into an autoclave in order to polymerize the composite material resting on the skin, generally at temperatures of about 200° C. and under particular pressure conditions.

(2) Description of the Prior Art

It is well-known that the frames of the prior art consist of mechanically welded structures.

During repeated passages in an autoclave at temperatures of about 200° C., these existing frames tend to twist and deform, especially at the level of their welding points.

Indeed, the multiplication of the welds of the frame has the drawback of generating a high risk of cracking of the structures. These cracks modify the initial geometry of the frame, which deformation is reflected in the skin and, hence, in the geometry of the part made from composite material that is polymerized, which will then have an inadequate, unstable and undesired geometry because of the presence of cracks in the frame.

As a result, the users are obliged to regularly check the integrity of the support frames, and to replace them if necessary. There is therefore a great interest in using a non-deformable support frame during the repetitions of the thermal cycles.

To this end, it is of course possible to oversize the elements the structure of the frame is comprised of, namely by increasing the cross-section. However, practical problems are related to the increase in weight. Indeed, the greater the thickness of these elements, the higher will be the energy required to quickly reach the appropriate temperature for polymerizing the composite material, and the longer will be the cooling time.

It is thus necessary to find the right balance for the value of the thickness of the elements the frame is comprised of, in order for the energy supply during the autoclaving process to be minimum while maintaining an adequate rigidity in order to avoid a change in shape of the frame.

The aim is to reduce as much as possible the costs of performing the process of polymerization of the composite material. The reduction can be achieved both by reducing the amount of energy required to perform the process and the frequency at which the frame/skin system is replaced due to cracks and/or deformations or losses of rigidity.

In addition, the risk of cracking of the frame with on top the skin, on which the composite material to be polymerized rests, also depends on the kind of material used, in particular on its expansion properties.

As is well-known, the skin and the frame are made from a low-expansion material in order to prevent cracking during the thermal cycling process.

In the field of laying-up of composite materials, depending on the composite material to be polymerized, the skin used may be of a very complex chemical composition, unlike the frame. In this case, the expansion properties of the skin differ from those of the frame comprised of a material different from and less complex than that of the skin. This difference in expansion properties between the frame and the skin has the drawback of increasing the risk of cracking of the assembly. This also results into a deformation of the frame/skin assembly. This deformation due to expansion properties distant from each other results, during the thermal cycling process, into the polymerization of a composite material with an inadequate geometry.

Thus, in order to cope with the aforementioned drawbacks of the state of the art, it is necessary to find an alternative solution for the frame/skin systems permitting the polymerization of composite material in an autoclave.

More specifically, it is necessary to find a suitable frame/skin system, which is non-cracking, non-deformable, and which maintains sufficient rigidity even after several cycles of polymerization of a composite material. It is also necessary to find a frame/skin system, which requires a volume of material permitting to minimize as much as possible the energy supply needed to obtain the target temperature during the polymerization process.

SUMMARY OF THE INVENTION

The aim of the present invention is to limit as much as possible the risk of cracking, but also the energy costs and the industrial cost of the process of polymerization of composite material. In this way, the frame/skin system can be long-lasting, remain unchanged and have a constant geometry, even after a repetition of the cycles of polymerization of composite material.

The purpose of the present invention is to provide a frame, at least part of which is intended to support a skin for receiving a part made from composite material to be polymerized in an autoclave, said skin defining the general shape of said part. Said frame is a single-piece foundry part permitting to cope with the drawbacks of the state of the art.

According to the invention, since the frame is a single-piece part obtained by casting and including no weld, there is no risk of cracking of the frame resulting from the presence of a weld, during the process of polymerization of the composite material in an autoclave.

In addition, according to further features said at least one portion of the frame intended to support said skin is formed by a portion having a shape complementary to said skin;

said portion, having a shape complementary to said skin, includes protruding elements intended to support said skin.

The portion of the frame intended to support the skin has a changing profile according to the shape of the skin.

Advantageously, the skin does not rest directly on said portion of the frame, but is maintained at a constant distance therefrom by said protruding elements. Indeed, said protruding elements of said portion directly support said skin and permit to maintain it at a constant distance. This distance is as small as possible in order to minimize the volume of the frame, but sufficient to permit the skin to reach the appropriate temperature of polymerization as quickly as possible.

According to other features, the frame of the invention:
includes segments comprising longitudinal ribs;
includes segments with a T-shaped cross-section, so as to form three longitudinal ribs.

According to a particular embodiment of the invention, the frame is comprised of gripping means and/or displacement means and three juxtaposed annular structures interconnected by cross members, each advantageously having protruding elements intended to support said skin.

It is noted that the number of annular structures depends on the size of the skin, this number increases as the size of said skin increases.

Said gripping means permit to facilitate the handling of the frame and permit the user to easily manipulate the frame of the invention, for example in order to place it in the autoclave or to remove it from same.

Advantageously, the thickness of said annular structures and the segments varies between 8 and 12 mm, is preferably 10 mm.

Thus, the frame is made with the smallest possible thickness permitting nevertheless to maintain the desired rigidity. The small thickness permits to optimize as much as possible the amount of energy necessary for the rise in temperature within the autoclave for the polymerization of the composite material in question. In comparison with the state of the art, the energy required for the rise in temperature for the polymerization of the same type of material is reduced by at least 20% with this thickness.

According to a particular embodiment of the invention, the frame is made from an alloy having an expansion coefficient $<7.10^{-6}$ $K^{-1}$ at 200° C.

Advantageously, according to this particular embodiment of the invention, said alloy has a thermal expansion coefficient between $4.10^{-6}$ $K^{-1}$ and $5.10^{-6}$ $K^{-1}$, preferably $4,6.10^{-6}$ $K^{-1}$ for temperatures varying between 0 and 200° C.

It will further be understood that the frame and the skin should preferably have very similar chemical compositions so that their expansion coefficients are also very similar, so as to minimize the risk of cracking.

Advantageously, it should be noted that according to the invention, the skin is made by molding, so that this permits to produce the frame and said skin from the same material grade.

The present invention therefore also relates to a support jib including a frame according to the invention, associated with a skin made from the same material grade, and preferably by molding.

Further features and advantages of the invention will become evident from the detailed description below of a non-restrictive embodiment of the invention, when referring to the attached figures.

DETAILED DESCRIPTION OF THE PREFERRED EMBODIMENTS

Figure 1:
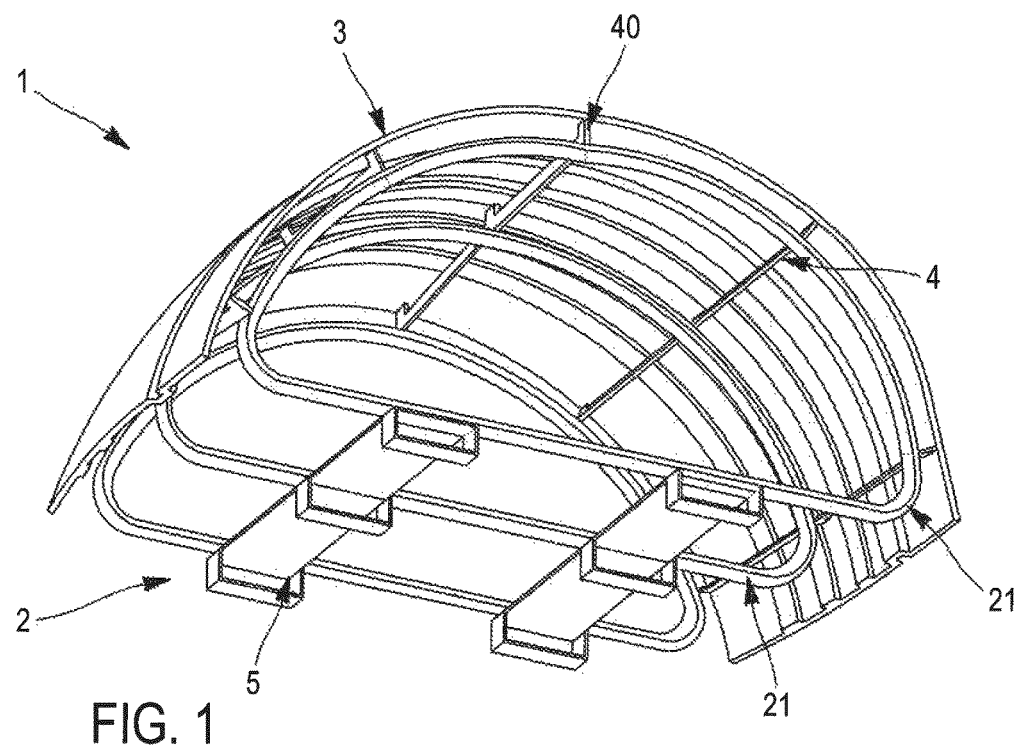
FIG. 1 shows a schematic perspective view of a support jig comprising a frame according to the invention.
Figure 2:
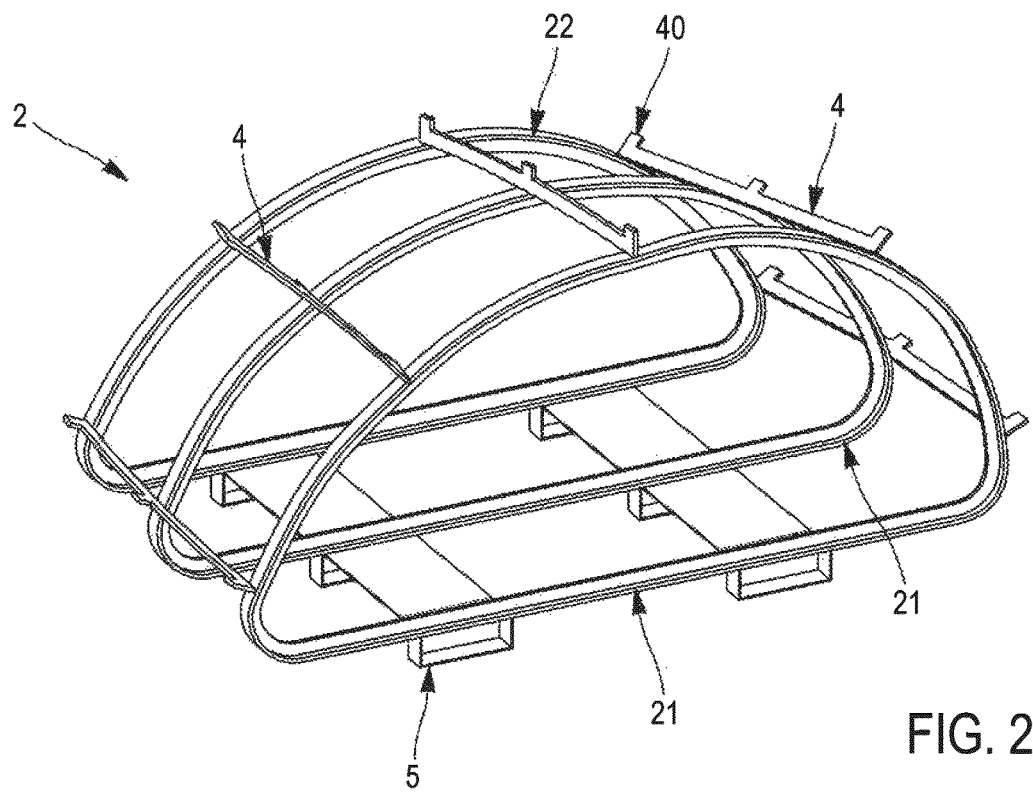
FIG. 2 shows a schematic perspective view from another angle of the same frame.

When referring to FIG. 1, we can see a support jig 1 for receiving a part, not shown, made of composite material for its polymerization in an autoclave, comprising a frame 2 according to the invention supporting a skin 3 receiving a part made from composite material to be polymerized in an autoclave.

In other words, the frame 2 permits to support a skin 3 on which is laid-up a pre-impregnated fabric for the production of a part made from composite material, before a polymerization in an autoclave or an oven.

The shape of the skin 3 for receiving the part made of composite material defines the general shape of the part made from composite material.

More specifically, the portion of the frame 2 intended to support the skin 3 is formed by a portion 22 having a shape complementary to the skin 3, as can be seen in the figures.

As shown in the figures, the portion 22 has protruding elements 40 intended to support the skin 3 and to maintain it at a constant distance from the portion 22.

The elements 40 may for example consist of barbs that are an integral part of the single-piece part, which forms the frame 2.

The geometry of the frame 2 is of course adapted to the shape of the skin 3 being used.

According to the invention, the frame 2 is a single-piece foundry part, through a molding process with lost mold and/or fusible core, so that it has no welds.

The absence of welds on the frame 2 results into preventing its cracking during the thermal cycles of polymerization in an autoclave or an oven.

The single-piece nature of the frame 2 permits to prevent it from twisting due to the repetition of thermal cycles of polymerization.

In addition, even in case of expansion, since the frame 2 is a single-piece one, the expansion will be uniform and homogenous.

According to the invention, the frame 2 includes segments comprising longitudinal ribs.

According to a particular embodiment, which can be seen in the figures, the frame 2 includes segments having a T-shaped cross-section, so as to form three longitudinal ribs.

According to the particular embodiment, which can be seen in the figures, the single-piece frame 2 is formed of three juxtaposed annular structures 21 interconnected by cross members 4, and also gripping means and/or displacement means 5.

These three annular structures 21 are spaced apart by a substantially constant distance, so as to create an aerated frame structure 2 capable of permitting the air to circulate.

These three annular structures 21 are capable of supporting the skin 3 for receiving the composite material to be polymerized, and have the advantage of reducing as much as possible the volume of material required to produce the single-piece part forming the frame assembly 2.

Advantageously, these annular structures 21 have a T-shaped cross-section in order to increase the rigidity of the single-piece part of the frame 2.

According to the embodiment of these figures, the assembly of these three annular structures 21 has, in the upper portion, the portion 22 including the cross members 4 and, in the lower portion, the gripping means and/or the displacement means 5.

The cross members 4 have protruding elements 40 intended to support the skin 3 and to maintain it at a constant distance from the portion 22, namely from the cross members 4.

Advantageously, the distance generated by the protruding elements 40 is as small as possible in order to minimize as much as possible the volume of the frame 2. In other words, the distance between the portion 22 of the frame 2, namely between the upper portion of the annular structures 21 and the skin 3, is preferably small in order to minimize the volume of the frame 2, but sufficient for the skin 3 not to be into direct contact with the entire portion 22 of the frame 2.

This configuration has the effect of aerating as much as possible the single-piece part of the frame 2 for the circulation of heat to be as easy and homogeneous as possible.

Since the frame 2 is intended to be inserted into an oven or an autoclave for the polymerization of a composite material, its aerated design permits to optimize the circulation of hot or cold air, as the case may be, within the oven or the autoclave.

According to this particular embodiment, the upper portions of the annular structures 21, representing the portion 22 of the frame 2, have the same curvature as the skin 3.

Thus, according to the invention, the assembly of annular structures 21, cross members 4, gripping and/or displacement means 5 is part of the same molded part, the whole being a single-piece part for forming the frame 2.

In addition, in order to limit the energy supply necessary for the rise in temperature within the autoclave for carrying out the polymerization of the composite material, the thickness of the annular structures 21 and cross members 4 varies between 8 and 12 mm, is preferably 10 mm.

This particular thickness permits the frame 2 to quickly reach its operating temperature within the autoclave for the polymerization of the composite material and to limit as much as possible the heat losses. Thus, an energy gain as well as an economic benefit are brought about.

As can be seen in the figures, the gripping and/or displacement means 5 permit for example the displacement of the frame 2 inside or outside an autoclave and/or an oven with a lift-truck type system.

According to another particular embodiment, the gripping means may namely consist of lugs present on said annular structures 21 and being an integral part of the single-piece foundry part formed by the frame 2.

Preferably, the skin 3 and the frame 2 are made from the same material grade, or from material grades having similar physical-chemical characteristics and properties, in order to limit the deformations due to the difference in expansion coefficient between the two materials.

Even more preferably, the material grade has a low expansion coefficient, which further limits the risks of deformation.

As already mentioned, it can be very advantageous to manufacture the skin 3 by a molding process with the same material grade as the one used for molding the frame 2.

What is claimed:

1. A frame, at least one portion of the frame being configured to support a skin for receiving a part made of composite material to be polymerized in an autoclave, the skin defining the shape of the part, wherein:
    the frame is a single-piece foundry part, wherein the single-piece foundry part comprises longitudinal segments and cross members each having a thickness in a range from 8 to 12 mm,
    the at least one portion of the frame configured to support the skin is formed by a portion having a shape complementary to the skin, the shape complementary to the skin having a changing profile according to the shape of the skin, wherein the changing profile includes a curvature, and
    the frame is made of an alloy having a linear expansion coefficient lower than $7 \times 10^{-6}$ $K^{-1}$ at 200° C.

2. The frame according to claim 1, wherein the portion having a shape complementary to the skin includes protruding elements aimed at supporting the skin.

3. The frame according to claim 1, wherein the frame includes segments comprising longitudinal ribs.

4. The frame according to claim 3, wherein the segments each have a T-shaped cross-section and the segments define three longitudinal ribs.

5. The frame according to claim 1, wherein the frame is formed of three juxtaposed annular structures interconnected by cross members, and means for gripping, means for displacing, or means for gripping and displacing.

6. The frame according to claim 5, wherein the annular structures and the cross members each have a thickness in a range from 8 to 12 mm.

7. A support jig for receiving a part made of composite material for polymerization in an autoclave, the support jig comprising:
    the frame according to claim 1, and
    a skin for receiving the part, at least a portion of the frame carrying the skin, the skin defining a general shape of the part,
    wherein the skin is of a material having a grade identical to a grade of a material used for the frame.

8. The support jig according to claim 7, wherein the skin is a molded skin.

9. The frame according to claim 6, wherein the thickness of the annular structures and the cross members is about 10 mm.

10. The frame according to claim 2, wherein the frame includes segments comprising longitudinal ribs.

11. The frame according to claim 2, wherein the frame includes segments comprising longitudinal ribs, the segments each have a T-shaped cross-section and the segments define three longitudinal ribs.

12. The frame according to claim 3, wherein the frame includes segments comprising longitudinal ribs, the segments each have a T-shaped cross-section and the segments define three longitudinal ribs.

13. The frame according to claim 2, wherein the frame is formed of three juxtaposed annular structures interconnected by cross members, and gripping and/or displacement means.

14. The frame according to claim 13, wherein the annular structures and the cross members each have a thickness in a range from 8 to 12 mm.

15. The frame according to claim 3, wherein the frame is formed of three juxtaposed annular structures interconnected by cross members, and gripping and/or displacement means.

16. The frame according to claim 15, wherein the annular structures and the cross members each have a thickness in a range from 8 to 12 mm.

17. The frame according to claim 4, wherein the frame is formed of three juxtaposed annular structures interconnected by cross members, and gripping and/or displacement means.

18. The frame according to claim 17, wherein the annular structures and the cross members each have a thickness in a range from 8 to 12 mm.

19. A support jig for receiving a part made of composite material for polymerization in an autoclave, the support jig comprising:
    the frame according to claim 2, and
    a skin for receiving the part, at least a portion of the frame carrying the skin, the skin defining a general shape of the part, wherein the skin is of a material having a grade identical to a grade of a material used for the frame.

20. The support jig according to claim 19, wherein the skin is a molded skin.

21. The support jig according to claim 19, wherein the portion having a shape complementary to the skin includes protruding elements, wherein the protruding elements support the skin at a constant distance from the portion having a shape complementary to the skin.

* * * * *